United States Patent
Nishigai et al.

(10) Patent No.: US 12,088,102 B2
(45) Date of Patent: Sep. 10, 2024

(54) POWER MANAGEMENT SERVER AND POWER MANAGEMENT METHOD

(71) Applicant: KYOCERA CORPORATION, Kyoto (JP)

(72) Inventors: Takanobu Nishigai, Kyoto (JP); Yosuke Kajimura, Kyoto (JP); Keita Futagami, Kyoto (JP); Rintaro Ando, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 51 days.

(21) Appl. No.: 18/006,869

(22) PCT Filed: Jul. 12, 2021

(86) PCT No.: PCT/JP2021/026171
§ 371 (c)(1),
(2) Date: Jan. 26, 2023

(87) PCT Pub. No.: WO2022/024736
PCT Pub. Date: Feb. 3, 2022

(65) Prior Publication Data
US 2023/0275435 A1  Aug. 31, 2023

(30) Foreign Application Priority Data
Jul. 29, 2020 (JP) .................... 2020-128390

(51) Int. Cl.
*H02J 3/28* (2006.01)
*H02J 3/38* (2006.01)
*H02J 13/00* (2006.01)

(52) U.S. Cl.
CPC .............. *H02J 3/28* (2013.01); *H02J 3/38* (2013.01); *H02J 13/00006* (2020.01)

(58) Field of Classification Search
CPC .......... H02J 3/28; H02J 13/00006; H02J 3/38
(Continued)

(56) References Cited

U.S. PATENT DOCUMENTS

2016/0056628 A1* 2/2016 Burstall ................ H02J 3/003
700/295
2019/0044332 A1* 2/2019 Saroya ............ H02J 13/00007
(Continued)

FOREIGN PATENT DOCUMENTS

JP    2016135040 A    7/2016
JP    2018190115 A    11/2018
(Continued)

*Primary Examiner* — Alfonso Perez Borroto
(74) *Attorney, Agent, or Firm* — HAUPTMAN HAM, LLP

(57) ABSTRACT

A power management server includes a receiver configured to receive an adjustment message for adjusting a supply-demand balance of a power system; a management unit configured to manage two or more apparatuses; a controller configured to determine individual adjusted power amounts each adjusted by a respective one of the two or more apparatuses and start timings at each of which a respective one of the two or more apparatuses starts power adjustment so that a total adjusted power amount requested via the adjustment message is adjusted; and a transmitter configured to transmit a control message including an information element specifying the individual adjusted power amounts and the start timings. The controller determines the start timings that are different from each other and each of which is for a respective one of the two or more apparatuses.

13 Claims, 8 Drawing Sheets

(58) Field of Classification Search
USPC .......................................................... 307/31
See application file for complete search history.

(56) References Cited

U.S. PATENT DOCUMENTS

2019/0109891 A1\* 4/2019 Paruchuri .............. G06Q 50/06
2019/0173282 A1\* 6/2019 Lelusz ..................... G05F 1/66

FOREIGN PATENT DOCUMENTS

| JP | 2018207745 A | 12/2018 |
| JP | 201954579 A | 4/2019 |
| JP | 2019525712 A | 9/2019 |

\* cited by examiner

POWER MANAGEMENT SERVER AND POWER MANAGEMENT METHOD

RELATED APPLICATIONS

The present application is a National Phase of International Application Number PCT/JP2021/026171 filed Jul. 12, 2021, which claims the benefit of priority from Japanese Patent Application No. 2020-128390, filed on Jul. 29, 2020.

TECHNICAL FIELD

The present disclosure relates to a power management server and a power management method.

BACKGROUND OF INVENTION

Conventionally, to adjust the supply-demand balance of a power system, operators such as resource aggregators use a known framework such as demand response (e.g., a virtual power plant (VPP)), in which the power of facilities is adjusted via control messages.

In the above-described framework, individual adjusted power amounts, which the respective facilities are requested to adjust, are determined such that the total adjusted power amount, which the resource aggregator is requested to adjust via control messages, is adjusted. For example, in determining the individual adjusted power amounts of the respective facilities, the adjustable amounts of the respective facilities are referred to (e.g., Patent Documents 1 and 2).

In the above-described framework, it is assumed that a power meter (e.g., a smart meter) is used that transmits power information of the facilities at predetermined time intervals (e.g., 30 minutes), and the supply-demand balance of the power system is adjusted with the predetermined time interval as the smallest unit.

Under such assumptions, the facilities have only to adjust the power (instantaneous power (kW)) such that the individual adjusted power amounts (integrated power (kWh)) are adjusted for the entirety of the predetermined time interval. In other words, the facilities need not continue to adjust a constant power throughout the entirety of the predetermined time interval.

As a result of diligent research, the present inventors have found that, according to the findings described above, the instantaneous power of the power can be adjusted such that the integrated power reaches the individual adjusted power amount at an early stage in the predetermined time interval. According to such an operation of the facilities, the power that is instantaneously adjusted within the predetermined time interval is concentrated in the first half of the predetermined time interval, and thus the supply-demand balance of the power system is disrupted.

CITATION LIST

Patent Literature

Patent Document 1: JP 2016-135040 A
Patent Document 2: JP 2018-190115 A

SUMMARY

A power management server according to a first feature includes: a receiver configured to receive an adjustment message for adjusting a supply-demand balance of a power system; a management unit configured to manage two or more apparatuses; a controller configured to determine individual adjusted power amounts each adjusted by a respective one of the two or more apparatuses and start timings at each of which a respective one of the two or more apparatuses starts power adjustment through which a total adjusted power amount requested via the adjustment message is adjusted; and a transmitter configured to transmit a control message including an information element specifying the individual adjusted power amounts and the start timings; in which the controller determines the start timings that are different from each other and each of which is for a respective one of the two or more apparatuses.

A power management server according to a second feature includes: a receiver configured to receive an adjustment message for adjusting a supply-demand balance of a power system; and a transmitter configured to transmit a control message to two or more gateway devices each controlling a respective one of apparatuses; in which the control message includes an information element specifying an adjusted power to be continuously adjusted by the apparatuses and an information element specifying a duration for which the adjusted power is to be maintained for a total adjusted power amount requested via the adjustment message to be adjusted.

A power management method according to a third feature includes: (A) receiving an adjustment message for adjusting a supply-demand balance of a power system; (B) determining individual adjusted power amounts each adjusted by a respective one of two or more apparatuses and start timings at each of which a respective one of the two or more apparatuses starts power adjustment so that a total adjusted power amount requested via the adjustment message is adjusted; and (C) transmitting a control message including an information element specifying the individual adjusted power amounts and the start timings; in which (B) includes determining the start timings that are different from each other and each of which is for a respective one of the two or more apparatuses.

A power management method according to a fourth feature includes: (A) receiving an adjustment message for adjusting a supply-demand balance of a power system; and (B) transmitting a control message to two or more gateway devices each controlling a respective one of apparatuses for a total adjusted power amount requested via the adjustment message to be adjusted; in which the power management method includes an information element specifying an adjusted power to be continuously adjusted by the apparatuses and an information element specifying a duration for which the adjusted power is to be maintained for a total adjusted power amount requested via the adjustment message to be adjusted.

DESCRIPTION OF EMBODIMENTS

Embodiments will be described below with reference to the accompanying drawings. Note that in the following description of the drawings, the same or similar components will be denoted by the same or similar reference signs. However, the drawings are schematic.

Embodiment

Power Management System

Figure 1:
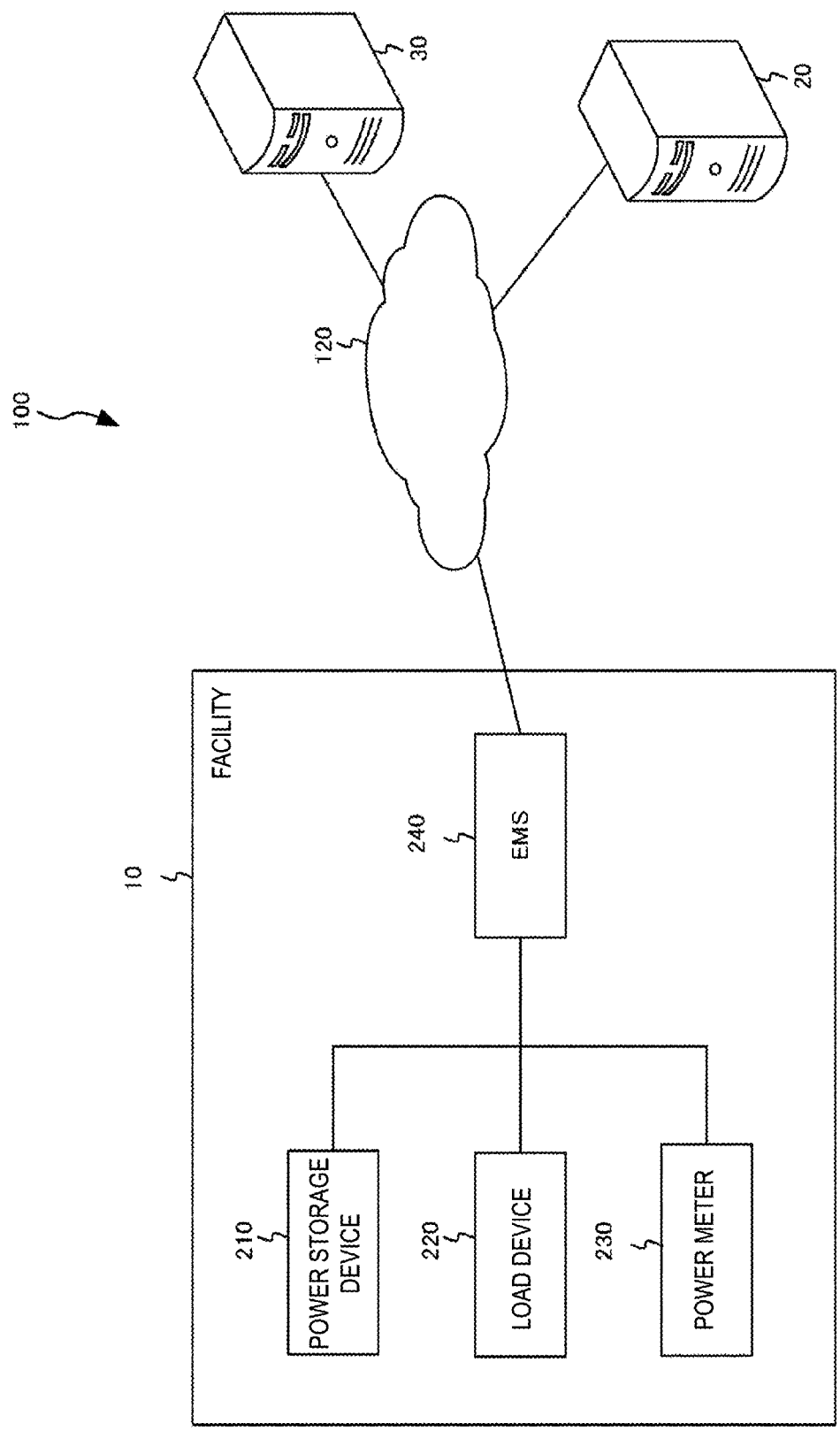
FIG. 1 is a diagram illustrating a power management system 100 according to an embodiment.

A power management system according to an embodiment will be described below. As illustrated in FIG. 1, a power management system 100 includes a facility 10, a lower server 20, and an upper server 30. The facility 10, the lower server 20, and the upper server 30 are connected to each other through a network 120. The network 120 is the Internet. The network may include a dedicated line such as a virtual private network (VPN), and may include a mobile communication network.

The facility 10 includes a power storage device 210, a load device 220, a power meter 230, and an energy management system (EMS) 240. The facility 10 may be a non-commercial facility such as a house, or may be a commercial facility such as an office or a store, although not particularly limited thereto. The facility 10 may be a factory. In FIG. 1, one facility 10 is illustrated for the sake of simplicity of explanation. However, two or more facilities 10 may be provided.

The power storage device 210 is a distributed power supply that charges power and discharges power. The power storage device 210 is an example of an apparatus managed by the lower server 20. The power storage device 210 may be an example of a distributed power supply used in a virtual power plant (VPP). For example, the power storage device 210 includes PCS and a power storage cell.

The load device 220 is an apparatus that consumes power. The load device 220 may be an example of an apparatus managed by the lower server 20. For example, the load device is an air conditioning device, an illumination device, an audio visual (AV) device, or the like.

The power meter 230 is a power meter that measures a power flow from a power system to the facility 10 and a reverse power flow from the facility 10 to the power system. For example, the power meter 230 may be a power meter that has been certified by a third party organization. The power meter 230 may be a smart meter that belongs to the upper server 30. The power meter 230 may have a function of transmitting a measurement value of the power meter 230 at predetermined transmission intervals (e.g., 30 minutes). The measurement value of the power meter 230 may be transmitted to the EMS 240, may be transmitted to the lower server 20, and may be transmitted to the upper server 30.

The EMS 240 is a device that manages the power of the facility 10. The EMS 240 may control the operating state of the power storage device 210 installed in the facility 10, or may control the operating state of the load device 220 installed in the facility 10. The EMS may be referred to as a gateway (GW) controller.

In the embodiment, communication between the lower server 20 and the EMS 240 is performed according to a first protocol. On the other hand, communication between the EMS and each device (e.g., the power storage device 210, the load device 220, and the power meter 230) may be performed according to a second protocol that may be different from the first protocol. For example, as the first protocol, a protocol based on open automated demand response (ADR) or a unique dedicated protocol can be used. For example, as the second protocol, a protocol based on ECHONET Lite, smart energy profile (SEP) 2.0, Konnex (KNX), or a unique dedicated protocol can be used. For example, both the first protocol and the second protocol may be unique dedicated protocols as long as they are protocols made of different rules. However, the first protocol and the second protocol may be protocols made of the same rules.

The lower server 20 is an example of a power management server that manages two or more apparatuses. The lower server 20 is a server managed by a business enterprise such as a power generation company, a power transmission/distribution company or a retailer, or a resource aggregator. A resource aggregator is a power company that provides reverse power flow to power generation companies, power transmission/distribution companies, retailers, or the like in a VPP. The resource aggregator may be a power company that produces a reduced power of the power flow (consumed power) of the facility 10 managed by the resource aggregator.

The upper server 30 is an example of a server that manages the power supply-demand balance of a power system. The upper server 30 is an entity that provides an infrastructure such as a power system. The upper server 30 may be a server managed by a power generation company or a power transmission/distribution company. The upper server may be a server managed by an aggregator controller that controls a resource aggregator.

The upper server 30 transmits to the lower server 20 an adjustment message requesting an adjustment to the supply-demand balance of the power system. The adjustment message may include a message (demand response (DR) message) requesting a reduction in the power demand from the power system. The adjustment message may include a message (output suppression message) requesting a reduction in the power supply to the power system.

In the embodiment, communication between the lower server 20 and the upper server is performed according to a third protocol. For example, as the third protocol, a protocol based on OpenADR can be used. When a protocol based on OpenADR is used as a first protocol, the third protocol may be the same as the first protocol.

Figure 2:
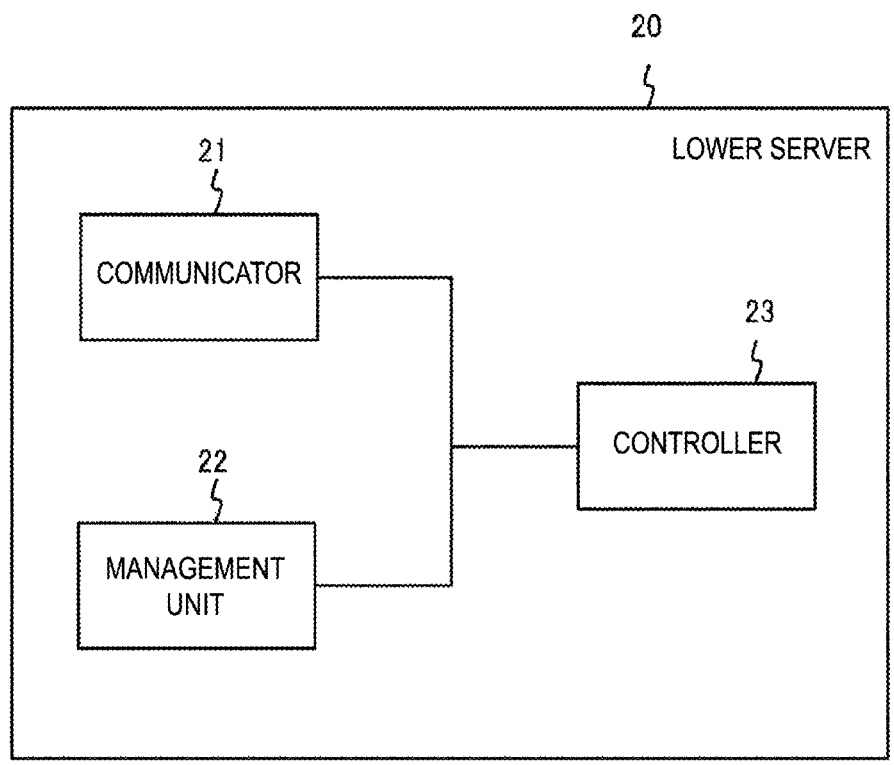
FIG. 2 is a diagram illustrating a lower server 20 according to the embodiment.

Lower Server A lower server according to the embodiment will be described below. As illustrated in FIG. 2, the lower server 20 includes a communicator 21, a management unit 22, and a controller 23.

As described above, the lower server 20 is an example of a power management server that manages two or more apparatuses.

The communicator 21 includes a communication module. The communication module may be a wireless communication module compliant with standards such as IEEE 802.11a/b/g/n, ZigBee, Wi-SUN, LTE, and 5G, or may be a wired communication module compliant with standards such as IEEE 802.3.

In the embodiment, the communicator 21 constitutes a receiver that receives adjustment messages from the upper server 30. Adjustment messages transmitted to the lower server 20 are messages transmitted to an area including the apparatus managed by the lower server 20. As described above, an adjustment message may be a DR message, or may be an output suppression message.

Here, the adjustment message includes an information element specifying an adjustment target period in which the supply-demand balance of the power system is adjusted. A predetermined time interval may be set as the smallest unit of the adjustment target period. The predetermined time interval may be the same as the predetermined transmission interval at which the power meter 230 transmits a measurement value. The result of adjusting the supply-demand balance of the power system may be verified by measurement values transmitted from the power meter 230.

Further, the adjustment message includes an information element that specifies the total adjusted power amount that is required to adjust the supply-demand balance of the power system. The total adjusted power amount may be represented by an integrated value of the power to be adjusted in the adjustment target period. The total adjusted power amount may be set with the baseline power as a reference. The baseline power may be referred to as the reference value. The baseline power may be an average value of the power demand for a certain period before the transmission of the adjustment message. The certain period may be set in accordance with the practice of the negawatt transactions, or may be set between the lower server 20 and the upper server 30. Alternatively, the total adjusted power amount may be set based on the supply-demand prediction value of the power system.

For example, assuming a case in which the instantaneous value of the adjusted power to be adjusted from the baseline power is determined with the baseline power as a reference, the total adjusted power amount may be represented by an integrated value of the difference between the supply-demand prediction value of the power system (or the baseline power) and the instantaneous value of the adjusted power.

The total adjusted power amount may be an information element specifying a range defined by the lower limit value of the total adjusted power amount and the upper limit value of the total adjusted power amount. The information element may include the lower limit value of the total adjusted power amount and the upper limit value of the total adjusted power amount, or may include a target power of the total adjusted power amount and a relative value based on the target power (e.g., ±XX % or ±YY kWh). When a relative value is set in advance, the relative value need not be included in the adjustment message.

In the embodiment, the communicator 21 transmits a control message for controlling the power storage device 210. The communicator 21 may transmit the control message to the power storage device 210, or may transmit the control message to the EMS 240 that controls the power storage device 210.

The management unit 22 includes a storage medium such as a non-volatile memory and/or a hard disk drive (HDD). The management unit 22 manages information regarding two or more power storage devices 210. The two or more power storage devices 210 may be installed in the same facility 10, or may be installed in different facilities 10. For example, the management unit 22 may manage the discharging power value of the power storage device 210, or may manage the charging power value of the power storage device 210. These power values may be defined by the minimum value and the maximum value. These power values may be deemed to have been replaced with the rated power value of the power storage device (PCS). The management unit 22 may manage the dischargeable capacity of the power storage device 210, or may manage the chargeable capacity of the power storage device 210. These capacities may be set based on the rated capacity and the power storage capacity of the power storage device 210 (power storage cell). The discharging power value, the charging power value, the dischargeable capacity, and the chargeable capacity may be collectively referred to as power storage information.

The controller 23 may include at least one processor. The at least one processor may be constituted by a single integrated circuit (IC) or a plurality of circuits (such as integrated circuits and/or discrete circuits) connected so as to be capable of communicating with each other.

In the embodiment, the controller 23 determines the individual adjusted power amounts each adjusted by a respective one of the two or more power storage devices 210 and the start timings at each of which a respective one of the two or more power storage devices starts power adjustment so that the total adjusted power amount requested via the adjustment message is adjusted. The controller 23 determines the start timings that are different from each other and each of which is for a respective one of the two or more power storage devices 210. The controller 23 may determine the individual adjusted power amount and the start timing based on the power storage information of each power storage device 210. The individual adjusted power amount may be represented by an integrated value of the power adjusted by the power storage device 210. Specifically, the controller 23 may determine the individual adjusted power amount and the start timing so that power equivalent to the total adjusted power amount is adjusted within a range where the remaining power storage amount of each power storage device 210 is not exhausted.

The controller 23 may determine the start timings that are different from each other and each of which is for a respective one of the two or more power storage devices 210 within the predetermined time interval. The controller 23 may determine the individual adjusted power amounts and the start timings with the lower limit value of the total adjusted power amount as a reference. The controller 23 may determine the individual adjusted power amounts and the start timings with the upper limit value of the total adjusted power amount as a reference.

Here, in cases where the apparatus for adjusting the supply-demand balance of the power system is the power storage device 210, the controller 23 determines the start timing at which the discharging operation and/or the charging operation of the power storage device is started. In such cases, the controller 23 determines the duration and the magnitude of power for the discharging operation and/or the charging operation of the power storage device 210.

For example, in cases where a reduction in the power demand from the power system is requested, the controller 23 determines, for each of the two or more power storage devices 210, the start timing at which the discharging operation of the power storage device 210 is started, the magnitude of the discharging power of the power storage device 210, and the duration of the discharging operation of the power storage device 210. The magnitude of the discharging power may be represented by the instantaneous value of the discharging power. The duration of the discharging operation may be represented by the end timing at which the discharging operation is ended, may be represented by the time for which the discharging operation is continued, or may be represented by the individual adjusted power amount. The individual adjusted power amount is represented by a result obtained by multiplying the instantaneous value of the discharging power by the duration of the discharging operation. Thus, the duration of the discharging operation is represented by a result obtained by dividing the individual adjusted power amount by the instantaneous value of the discharging power.

In cases where a reduction in the power supply to the power system is requested, the controller 23 determines, for each of the two or more power storage devices 210, the start timing at which the charging operation of the power storage device 210 is started, the magnitude of the charging power of the power storage device 210, and the duration of the charging operation of the power storage device 210. The magnitude of the charging power may be represented by the instantaneous value of the charging power. The duration of the charging operation may be represented by the end timing at which the charging operation is ended, may be represented by the time for which the charging operation is continued, or may be represented by the individual adjusted power amount. The individual adjusted power amount is represented by a result obtained by multiplying the instantaneous value of the charging power by the duration of the charging operation. Thus, the duration of the charging operation is represented by a result obtained by dividing the individual adjusted power amount by the instantaneous value of the charging power.

Further, the controller 23 may determine the start timings such that the discharging operations of the power storage devices 210 are performed throughout the adjustment target period for which power adjustment is requested via the adjustment message. In other words, the controller 23 may determine the start timing of each of the two or more power storage devices 210 such that the discharging operations of the two or more power storage devices are not interrupted.

For example, the controller 23 causes the end timing at which the n-th controlled discharging operation of a power storage device 210 is ended and the start timing at which the n+1-th controlled discharging operation of a power storage device 210 is started to coincide with each other. That an end timing and a start timing are caused to coincide with each other may mean that the end timing of the n-th discharging operation is at 8 o'clock 59 minutes 59 seconds and the start timing of the n+1-th discharging operation is at 9 o'clock 00 minutes 00 seconds, or may mean that the end timing of the n-th discharging operation is at 9 o'clock 00 minutes 00 seconds and the start timing of the n+1-th discharging operation is at 9 o'clock 00 minutes 00 seconds. That is, the adjustment target period may include an instantaneous blank time (e.g., one second) of the discharging operation, or need not include any instantaneous blank time of the discharging operation. From the perspective of appropriately maintaining the supply-demand balance of the power system, it is preferable that no instantaneous blank time of the discharging operation be included. Note that the above-described time such as 8 o'clock 59 minutes 59 seconds or 9 o'clock 00 minutes 00 seconds may be considered synonymous with timing.

The controller 23 may determine the start timings such that the charging operations of the power storage devices 210 are performed throughout the adjustment target period for which power adjustment is requested via the adjustment message. In other words, the controller 23 may determine the start timing of each of the two or more power storage devices 210 such that the charging operation of the two or more power storage devices 210 is not interrupted.

For example, the controller 23 causes the end timing at which the n-th controlled charging operation of a power storage device 210 is ended and the start timing at which the n+1-th controlled charging operation of a power storage device 210 is started to coincide with each other. That an end timing and a start timing are caused to coincide with each other may mean that the end timing of the n-th charging operation is at 8 o'clock 59 minutes 59 seconds and the start timing of the n+1-th charging operation is at 9 o'clock 00 minutes 00 seconds, or may mean that the end timing of the n-th charging operation is at 9 o'clock 00 minutes 00 seconds and the start timing of the n+1-th charging operation is at 9 o'clock 00 minutes 00 seconds. That is, the adjustment target period may include an instantaneous blank time (e.g., one second) of the charging operation, or need not include any instantaneous blank time of the charging operation. From the perspective of appropriately maintaining the supply-demand balance of the power system, it is preferable that no instantaneous blank time of the charging operation be included. Note that the above-described time such as 8 o'clock 59 minutes 59 seconds or 9 o'clock 00 minutes 00 seconds may be considered synonymous with timing.

Example of Adjusting Supply-Demand Balance of Power System

An example of adjusting the supply-demand balance of the power system according to the embodiment will be described below with reference to FIGS. 3 to 5. In the following, a case will be illustrated in which the lower server 20 manages power storage devices A to D, and a reduction in the demand of the power system is requested. A case will be illustrated in which the start timings of the power storage devices are different from each other within the predetermined time interval that is the smallest unit of the adjustment target period. TS denotes the start timing of the predetermined time interval. TE denotes the end timing of the predetermined time interval.

Figure 3:
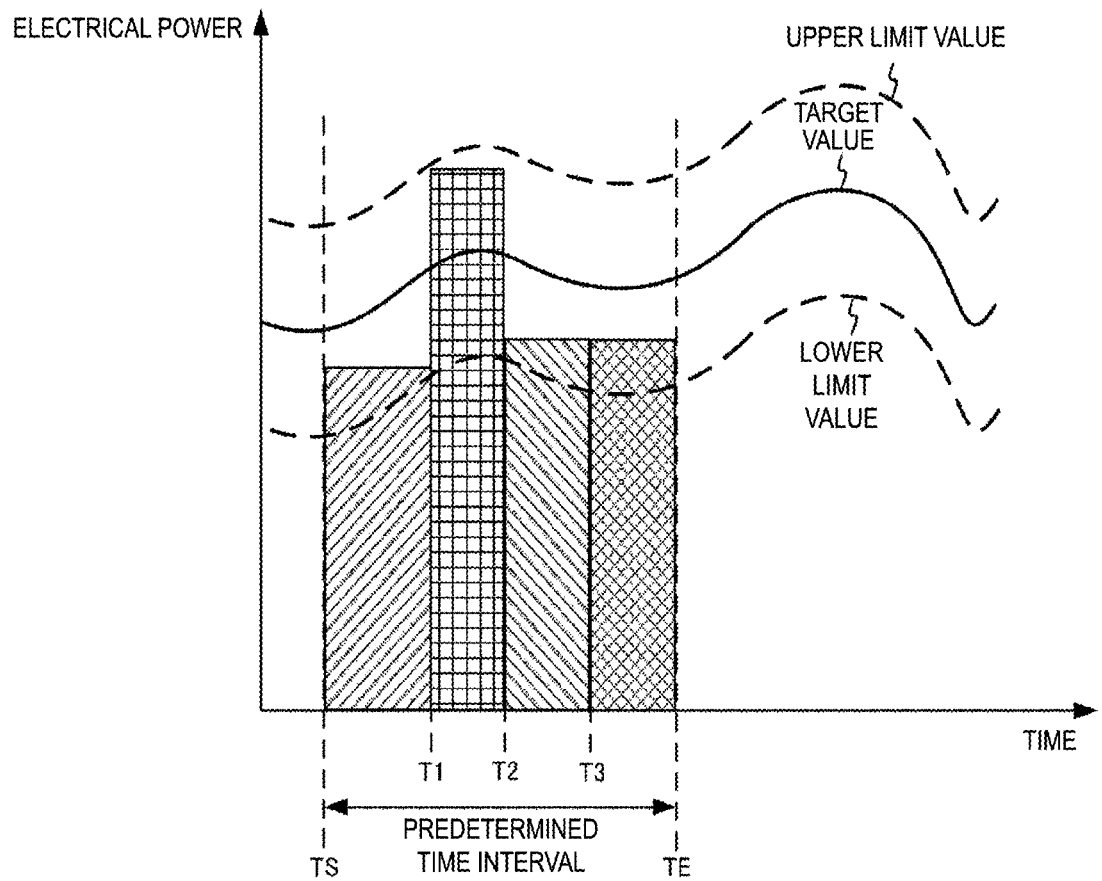
FIG. 3 is a chart illustrating an example of adjusting the supply-demand balance of a power system according to the embodiment.
Figure 4:
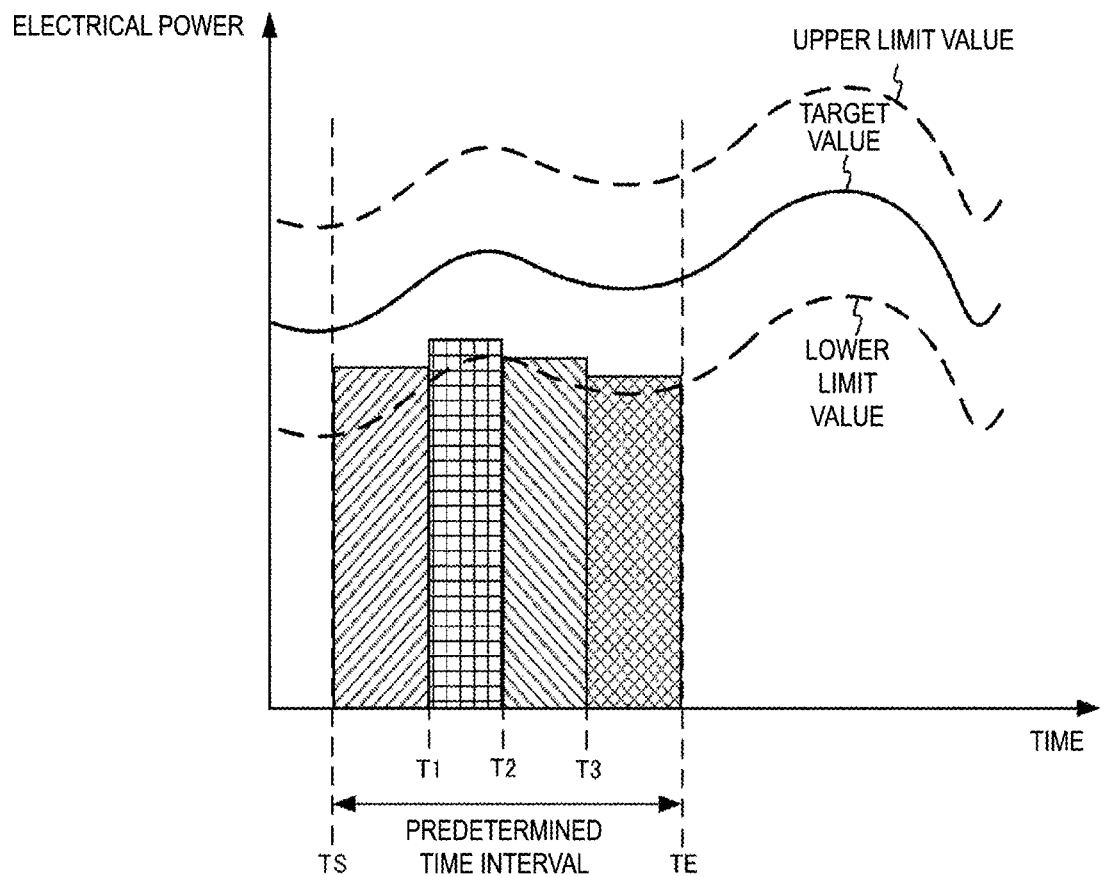
FIG. 4 is a chart illustrating an example of adjusting the supply-demand balance of the power system according to the embodiment.
Figure 5:
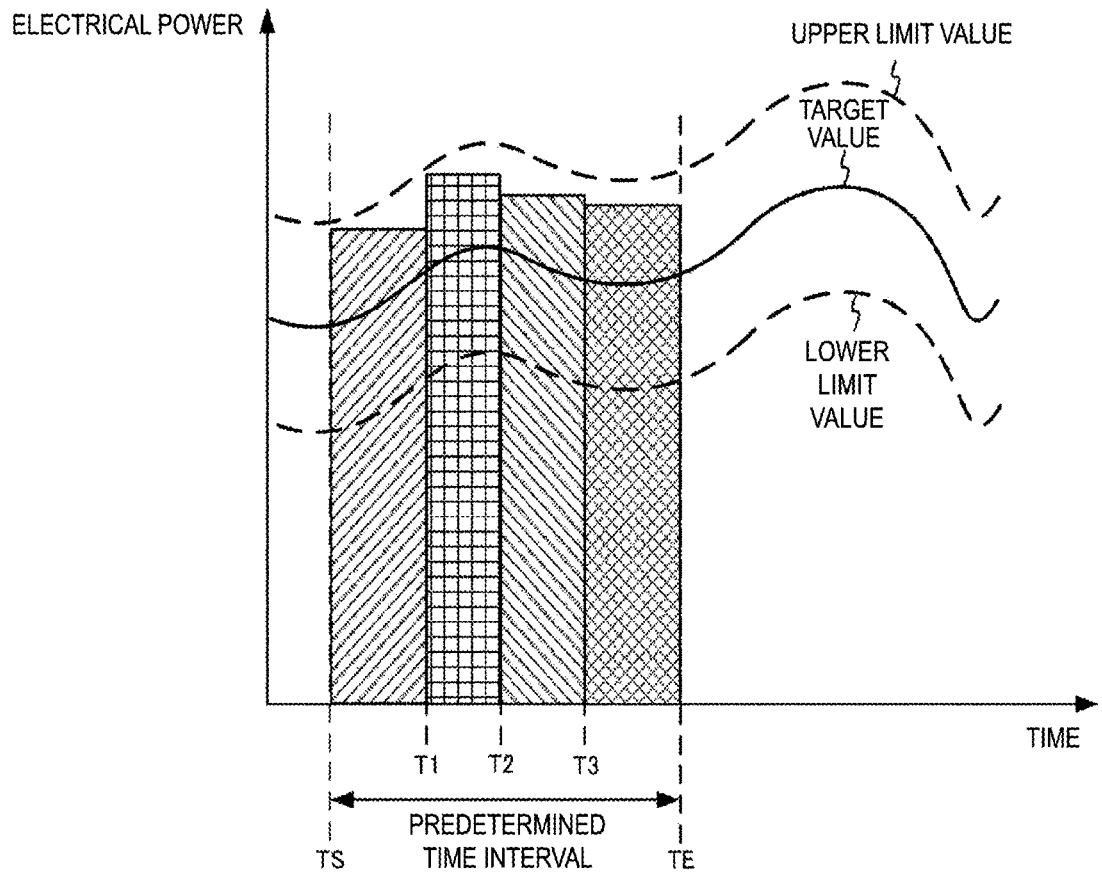
FIG. 5 is a chart illustrating an example of adjusting the supply-demand balance of the power system according to the embodiment.
Figure 5:
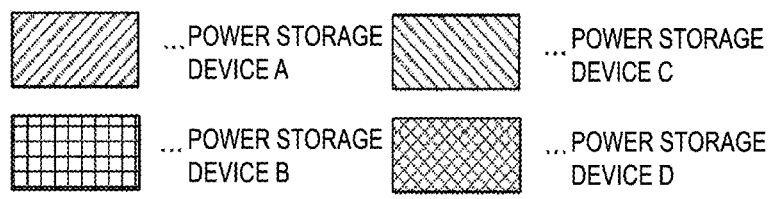

In FIGS. 3 to 5, the vertical axis represents the discharging power, and the horizontal axis represents time. The upper limit value represents the time transition of the upper limit value of the instantaneous value of the total adjusted power. The lower limit value represents the time transition of the lower limit value of the instantaneous value of the total adjusted power. The target value represents the time transition of the target value of the instantaneous values of the total adjusted power. The target value may be an intermediate value between the upper limit value and the lower limit value. The range defined by the upper limit value and the lower limit value is specified by an information element included in the adjustment message received from the upper server 30.

As illustrated in FIG. 3, the lower server 20 determines TS as the start timing of the power storage device A, and determines T1 as the end timing of the power storage device A. The lower server 20 determines T1 as the start timing of the power storage device B, and determines T2 as the end timing of the power storage device B. The lower server 20 determines T2 as the start timing of the power storage device C, and determines T3 as the end timing of the power storage device C. The lower server 20 determines T3 as the start timing of the power storage device D, and determines TE as the end timing of the power storage device D. That is, the lower server 20 determines the start timings of the two or more power storage devices 210 such that the discharging operations are not interrupted in the predetermined time interval.

Further, the lower server 20 determines the discharging power of the power storage device A so that the discharging power is located between the upper limit value and the lower limit value in the duration (between TS and T1) of the power storage device A. The lower server 20 determines the discharging power of the power storage device B so that the discharging power is located between the upper limit value and the lower limit value in the duration (between T1 and T2) of the power storage device B. The lower server 20 determines the discharging power of the power storage device C so that the discharging power is located between the upper limit value and the lower limit value in the duration (between T2 and T3) of the power storage device C. The lower server 20 determines the discharging power of the power storage device D so that the discharging power is located between the upper limit value and the lower limit value in the duration (between T3 and TE) of the power storage device D.

In the embodiment, the power storage device 210 is configured to continue the discharging operation at the discharging power set by the lower server 20 (EMS 240). Accordingly, as illustrated in FIG. 3, the magnitude of the discharging power does not change in the duration of the discharging operation.

For example, among cases where the total adjusted power amount in the predetermined time interval is 4 kWh/30 minutes, a case is illustrated in which the total adjusted power amount is equally allocated among the power storage devices. In such a case, the individual adjusted power amount of each power storage device is 1 kWh/30 minutes. For example, for the power storage device A, the start timing may be 0 minutes (TS), the end timing may be 9 minutes (T1), the duration may be 9 minutes, and the magnitude of the discharging power may be 6.67 kW. For the power storage device B, the start timing may be 9 minutes (T1), the end timing may be 14 minutes (T2), the duration may be 5 minutes, and the magnitude of the discharging power may be 12 kW. For the power storage device C, the start timing may be 14 minutes (T2), the end timing may be 22 minutes (T3), the duration may be 8 minutes, and the magnitude of the discharging power may be 7.5 kW. For the power storage device D, the start timing may be 22 minutes (T3), the end timing may be 40 minutes (T4), the duration may be 30 minutes, and the magnitude of the discharging power may be 7.5 kW.

Under the presuppositions illustrated in FIG. 3, the lower server 20 may determine the discharging power of each power storage device with the lower limit value as a reference, as illustrated in FIG. 4. In other words, the lower server 20 may determine the discharging power of each power storage device along the lower limit value under the condition that the discharging power does not fall below the lower limit value in the duration of each power storage device. However, the lower server 20 may determine the discharging power of at least some of the power storage devices with the upper limit value as a reference.

Under the presuppositions illustrated in FIG. 3, the lower server 20 may determine the discharging power of each power storage device with the upper limit value as a reference, as illustrated in FIG. 5. In other words, the lower server 20 may determine the discharging power of each power storage device along the upper limit value under the condition that the discharging power does not exceed the upper limit value in the duration of each power storage device. However, the lower server 20 may determine the discharging power of at least some of the power storage devices with the lower limit value as a reference.

Power Management Method

Figure 6:
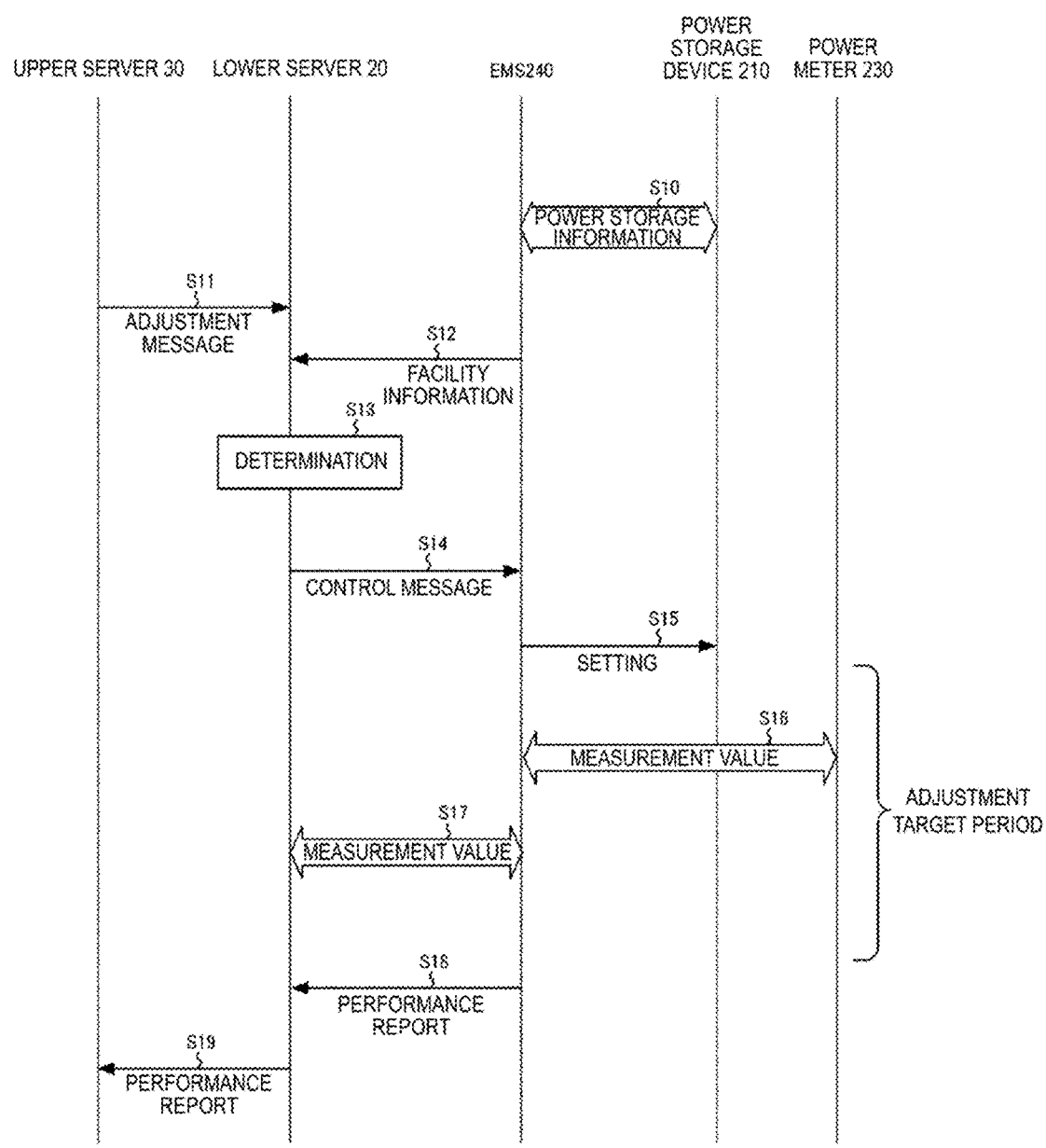
FIG. 6 is a diagram illustrating a power management method according to the embodiment.

A power management method according to the embodiment will be described below. Although one facility 10 (power storage device 210) is illustrated in FIG. 6 for the sake of simplicity of description, two or more power storage devices 210 are actually installed. The two or more power storage devices 210 may be installed in the same facility 10, or may be installed in different facilities 10.

As illustrated in FIG. 6, in step S10, the EMS 240 receives information (power storage information) related to the power storage device 210 from the power storage device 210. The power storage information may include the discharging power value, the charging power value, the chargeable capacity, the dischargeable capacity, and the like. The EMS 240 may periodically receive the power storage information.

In step S11, the upper server 30 transmits an adjustment message to the lower server 20. The adjustment message includes an information element specifying an adjustment target period in which the supply-demand balance of the power system is adjusted. The adjustment message includes an information element that specifies the total adjusted power amount that is required to adjust the supply-demand balance of the power system.

In step S12, the EMS 240 transmits facility information to the lower server 20. For example, the facility information includes the power storage information described above.

In step S13, the lower server 20 determines the individual adjusted power amount and the start timing of the power storage device 210 based on the power storage information of the power storage device 210. Further, the lower server 20 may determine the duration and the magnitude of power for at least any one of the discharging operation and the charging operation of the power storage device 210.

In step S14, the lower server 20 transmits a control message to the EMS 240. The control message includes an information element specifying the individual adjusted power amount and the start timing of the power storage device 210. The control message may include an information element specifying the duration and the magnitude of power of the power storage device 210.

In step S15, the EMS 240 sets the operation mode of the power storage device 210 based on the control message. The operation mode may include a discharging operation, a charging operation, a standby operation, and the like. Such setting may be performed before the start of the adjustment target period, or may be performed after the start of the adjustment target period. The EMS 240 may set the start timing at which the discharging operation or charging operation is started. Alternatively, the EMS 240 may set the operation mode of the power storage device 210 at the start timing. In setting the operation mode of the power storage device 210, the EMS 240 may set the magnitude of the discharging power or charging power. In setting the operation mode of the power storage device 210, the EMS 240 may set the duration of the discharging operation or charging operation. In setting the operation mode of the power storage device 210, the EMS 240 may set the end timing of the discharging operation or charging operation. The power storage device 210 operates according to the content set by the EMS 240.

In step S16, the power meter 230 transmits a measurement value of the power meter to the EMS 240. The power meter 230 transmits measurement values at predetermined transmission intervals.

In step S17, the EMS 240 transmits a measurement value of the power meter 230 to the lower server 20. The EMS 240 may transmit a measurement value to the lower server 20 when the measurement value is received from the power meter 230. The processing of step S17 may be omitted.

In step S18, the EMS 240 transmits a performance report on the power adjusted in the adjustment target period to the lower server 20. For example, the performance report may include an integrated value of the discharging power or charging power of the power storage device 210 installed in the facility 10. The performance report may include an integrated value for each predetermined time interval that is the smallest unit of the adjustment target period. The processing of step S18 may be omitted when the lower server 20 can grasp the performance of the power adjusted in the adjustment target period from the measurement value received in step S17.

In step S19, the lower server 20 transmits a performance report on the power adjusted in the adjustment target period to the upper server 30. For example, the performance report may include an integrated value of the discharging power or charging power of the power storage device 210 managed by the lower server 20. The performance report may include an integrated value for each predetermined time interval that is the smallest unit of the adjustment target period.

Actions and Effects

In the embodiment, the lower server 20 determines start timings that are different from each other and each of which is for a respective one of the two or more power storage devices 210 so that the total adjusted power amount is adjusted. According to such a configuration, a situation in which the discharging operations or charging operations of the two or more power storage devices 210 are biased toward the first half of the adjustment target period (or the predetermined time interval) can be suppressed. That is, instantaneous disturbance in the supply-demand balance of the power system can be suppressed.

In the embodiment, the lower server 20 may determine the individual adjusted power amounts and the start timings with the lower limit value of the total adjusted power amount as a reference. According to such a configuration, when there are many power storage devices having a small adjustable power among the power storage devices 210 managed by the lower server 20, the supply-demand balance of the power system is easily attained. When the power adjustable by an apparatus (e.g., the load device 220) other than the power storage devices 210 managed by the lower server 20 is large, the supply-demand balance of the power system is easily attained.

In the embodiment, the lower server 20 may determine the individual adjusted power amounts and the start timings with the upper limit value of the total adjusted power amount as a reference. According to such a configuration, when there are many power storage devices having a large adjustable power among the power storage devices 210 managed by the lower server 20, the supply-demand balance of the power system is easily attained. When the power adjustable by an apparatus (e.g., the load device 220) other than the power storage devices 210 managed by the lower server 20 is small, the supply-demand balance of the power system is easily attained.

Variation 1

A variation 1 of the embodiment will be described below. In the following, differences from the embodiment will be mainly described.

In the embodiment, as illustrated in FIG. 3 and the like, the magnitude of the discharging power (or the charging power) does not change in the duration of the discharging operation (or the charging operation). In contrast, in the variation 1, the lower server 20 (communicator 21) transmits a control message including an information element specifying two or more different start timings to one or more power storage devices 210. That is, in the variation 1, the magnitude of the discharging power (or the charging power) may change in the duration of the discharging operation (or the charging operation).

Figure 7:
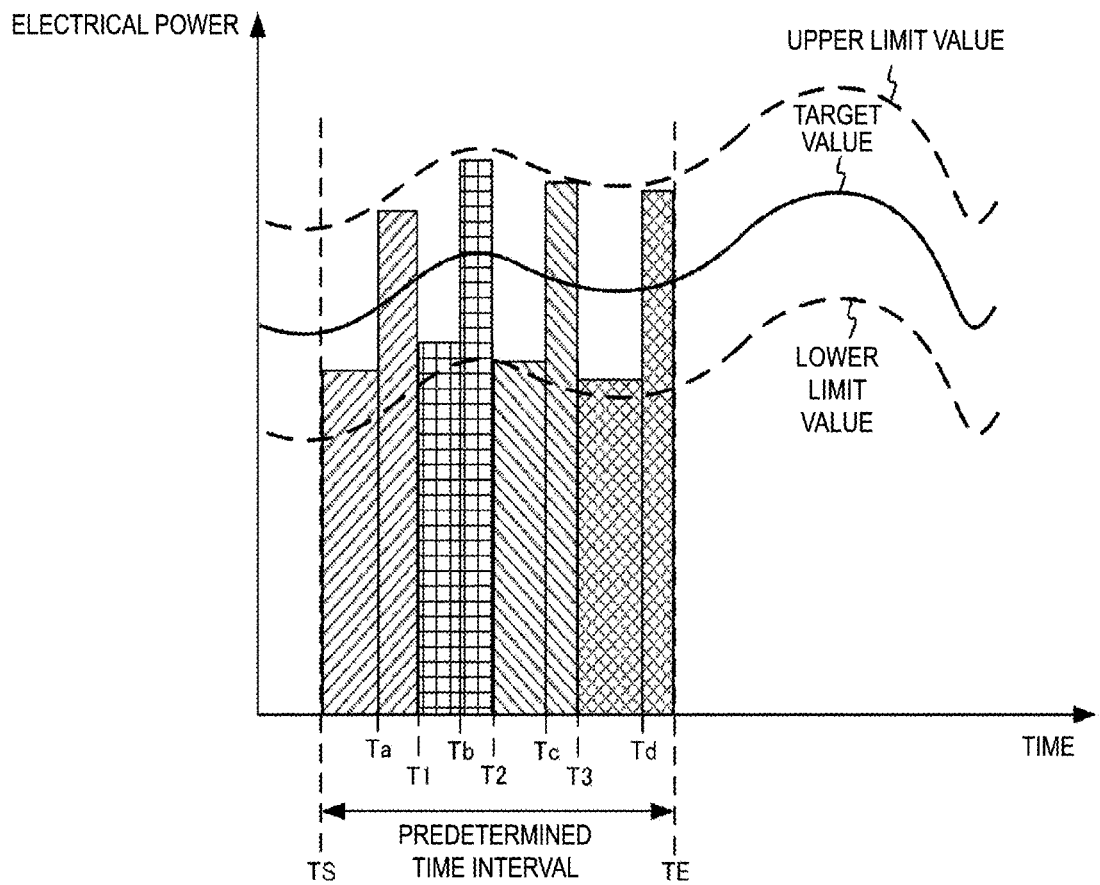
FIG. 7 is a chart illustrating an example of adjusting the supply-demand balance of a power system according to a variation 1.
Figure 7:
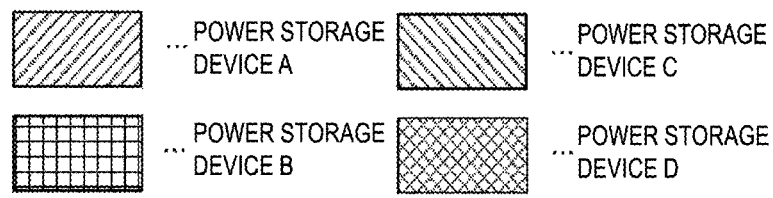
Figure 8:
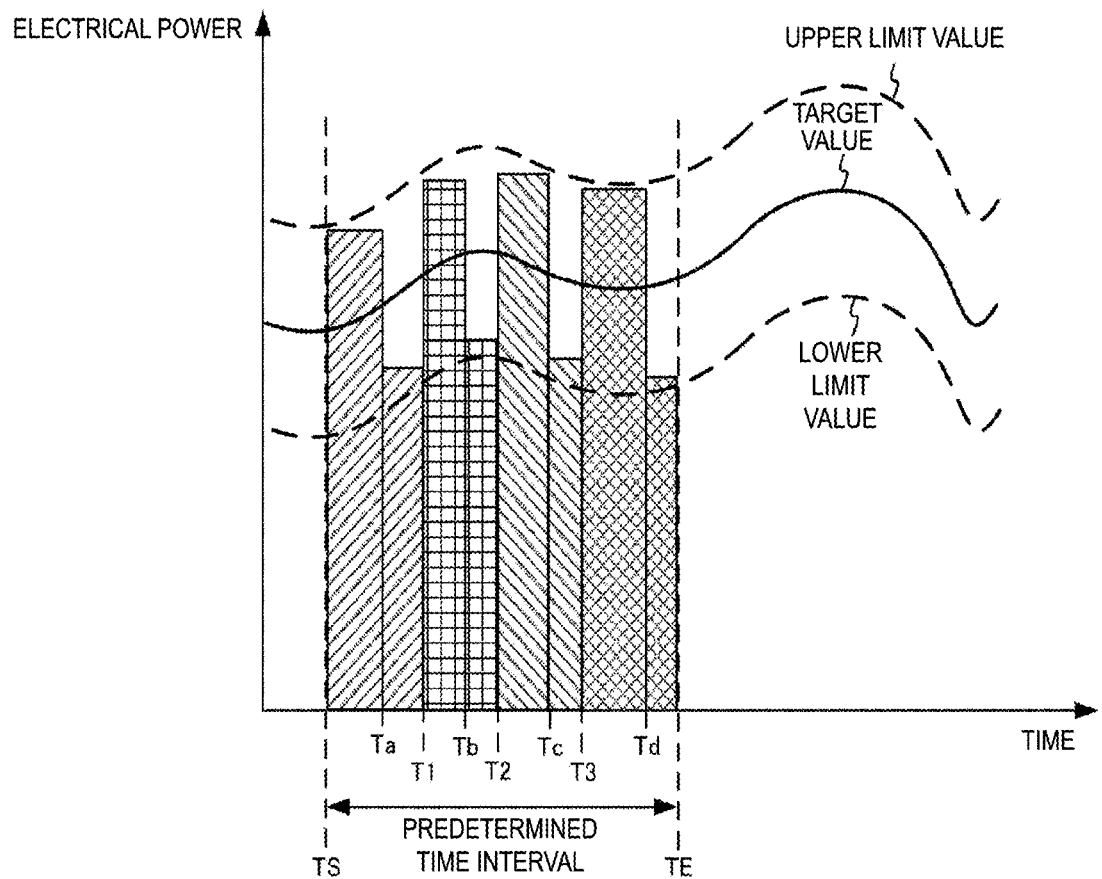
FIG. 8 is a chart illustrating an example of adjusting the supply-demand balance of the power system according to the variation 1.

Example of Adjusting Supply-Demand Balance of Power System In the following, an example of adjusting the supply-demand balance of the power system according to the variation 1 will be described with reference to FIGS. 7 and 8. In the following, as in FIGS. 3 to 5, a case will be illustrated in which the lower server 20 manages the power storage devices A to D, and a reduction in the demand of the power system is requested. The reference signs and the like illustrated in the figures are as in FIGS. 3 to 5, and thus description thereof is omitted.

First, a variation to FIG. 4 described above will be described. As illustrated in FIG. 7, the lower server 20 determines TS as a start timing of the power storage device A, determines Ta as an end timing of the power storage device A, determines Ta as a start timing of the power storage device A, and determines T1 as an end timing of the power storage device A. The lower server 20 may determine the discharging power of the power storage device A with the lower limit value as a reference between TS and Ta, and determine the discharging power of the power storage device A with the upper limit value as a reference between Ta and T1. As with the power storage device A, two or more start timings may also be determined for the power storage devices B to D. Compared with FIG. 4, Ta, Tb, Tc, and Td are determined as additional start timings. Ta, Tb, Tc, and Td may be considered as additional end timings.

Second, a variation to FIG. 5 described above will be described. As illustrated in FIG. 8, the lower server 20 determines TS as a start timing of the power storage device A, determines Ta as an end timing of the power storage device A, determines Ta as a start timing of the power storage device A, and determines T1 as an end timing of the power storage device A. The lower server 20 may determine the discharging power of the power storage device A with the upper limit value as a reference between TS and Ta, and determine the discharging power of the power storage device A with the lower limit value as a reference between Ta and T1. As with the power storage device A, two or more start timings may also be determined for the power storage devices B to D. Compared with FIGS. 5, Ta, Tb, Tc, and Td are determined as additional start timings. Ta, Tb, Tc, and Td may be considered as additional end timings.

Here, the lower server 20 may determine two or more start timings before the start of the predetermined time interval, or may determine an additional start timing midway through the predetermined time interval. For example, an additional start timing may be determined when the power consumption of the load device 220 of the facility 10 is different from the prediction value, resulting in an excess or deficiency in the individual adjusted power amounts.

Variation 2

A variation 2 of the embodiment will be described below. In the following, differences from the embodiment will be mainly described.

In the embodiment, a case has been illustrated in which the discharging operation (or the charging operation) of each power storage device 210 is not interrupted in the adjustment target period. However, the embodiment is not limited to this example.

For example, the discharging operation (or the charging operation) of each power storage device 210 may be interrupted in the adjustment target period. The time for which the discharging operation (or the charging operation) is interrupted may be shorter than a predetermined threshold value. The predetermined threshold value may be set based on the time (variation allowable time) for which instantaneous variation in the power system is allowed. For example, the predetermined threshold value may be the same value as the variation allowable time, or may be a value smaller than the variation allowable time.

Alternatively, discharging operations (or charging operations) of each power storage device 210 may overlap each other in the adjustment target period. The time for which discharging operations (or charging operations) overlap each other may be shorter than the predetermined threshold value. The predetermined threshold value may be set based on the time (variation allowable time) for which instantaneous variation in the power system is allowed. For example, the predetermined threshold value may be the same value as the variation allowable time, or may be a value smaller than the variation allowable time.

Variation 3

A variation 3 of the embodiment will be described below. In the following, differences from the embodiment will be mainly described.

In the embodiment, a case has been illustrated in which the lower server 20 determines the individual adjusted power amounts and the start timings. In the variation 3, the lower server 20 may be expressed as performing the following operations.

Specifically, the lower server 20 includes a receiver (communicator 21) that receives an adjustment message for adjusting the supply-demand balance of the power system, and a transmitter (communicator 21) that transmits a control message to two or more gateway devices (hereinafter, the EMS 240) each controlling a respective one of apparatuses (hereinafter, the power storage devices 210). The control message includes an information element specifying an adjusted power to be continuously adjusted by the power storage device and an information element specifying a duration for which the adjusted power is to be maintained so that the total adjusted power amount requested via the adjustment message is adjusted.

The adjusted power may be represented by an instantaneous value of the adjusted power (the discharging power or charging power). Accordingly, the information element specifying an adjusted power may include an information element indicating an instantaneous value of the discharging power or charging power. The duration may be represented by the time for which power adjustment is to be continued after receiving the control message. Accordingly, the information element identifying a duration may include an information element indicating the time for which the power storage device 210 is to continue the adjusting operation. In such a case, the power storage device 210 may start the adjusting operation (the discharging operation or charging operation) in response to receiving the control message, and maintain the adjusted power over the duration. The duration may be defined by the start timing and the duration. Accordingly, the information element specifying a duration may include an information element indicating a start timing (e.g., a start time) and a duration. In such a case, the power storage device 210 may start the adjusting operation at the start timing, and maintain the adjusted power over the duration. The duration may be defined by the start timing and the end timing. Accordingly, the information element specifying a duration may include an information element indicating a start timing (e.g., a start time) and an end timing (e.g., an end time). In such a case, the power storage device 210 may maintain the adjusted power from the start timing to the end timing.

As in the embodiment, the lower server 20 may determine start timings that are different from each other and each of which is for a respective one of the two or more power storage devices 210 within the predetermined time interval. In accordance with the start timings, the lower server 20 may transmit control messages at timings that are different from each other and each of which is for a respective one of the two or more power storage devices 210. The lower server 20 may determine end timings that are different from each other and each of which is for a respective one of the two or more power storage devices 210 within the predetermined time interval. In accordance with the end timings, the lower server 20 may transmit control messages at timings that are different from each other and each of which is for a respective one of the two or more power storage devices 210, the control messages instructing that the adjusting operation be stopped.

Other Embodiments

Although the present invention is described by the above-described embodiments, it should not be understood that the description and the drawings, which form a part of this disclosure, limit this invention. Various alternative embodiments, examples, and operational techniques will be apparent from this disclosure to those skilled in the art.

In the embodiment, a case has been illustrated in which the facility 10 includes one power storage device 210. However, the embodiment is not limited to this example. The facility 10 may include two or more power storage devices 210.

In the embodiment, a case has been illustrated in which the lower server 20 controls the supply-demand balance of the power system in power storage device 210 units. However, the embodiment is not limited to this example. The lower server 20 may control the supply-demand balance of the power system on a facility 10 by facility 10 basis. In such a case, the power storage device 210 may be deemed to have been replaced by the facility 10.

In the embodiment, a case has been illustrated in which the apparatus for adjusting the supply-demand balance of the power system is the power storage device 210. However, the embodiment is not limited to this example. The apparatus for adjusting the supply-demand balance of the power system may include the load device 220. The apparatus for adjusting the supply-demand balance of the power system may include a distributed power supply other than the power storage device 210. The distributed power supply other than the power storage device 210 may include one or more distributed power supplies selected from among a solar cell device, a fuel cell device, a wind power generation device, a geothermal power generation device, a hydroelectric power generation device, or the like.

Although not particularly mentioned in the embodiment, the lower server 20 may switch between first processing in which the individual adjusted power amounts and the start timings are determined with the lower limit value of the total adjusted power amount as a reference, and second processing in which the individual adjusted power amounts and the start timings are determined with the upper limit value of the total adjusted power amount as a reference. For example, the lower server 20 may switch between the first processing and the second processing based on the time zone of the adjustment target period. When the adjustment target period is nighttime and the charging operation of the power storage device is scheduled after the adjustment target period, the lower server 20 may perform the second processing in response to a request for a reduction in the power demand of the power system (the discharging operation of the power storage device 210). When the adjustment target period is evening and the discharging operation of the power storage device 210 is scheduled after the adjustment target period, the lower server 20 may perform the first processing in response to a request for a reduction in the power demand of the power system (the discharging operation of the power storage device 210). From the same and/or a similar perspective, the lower server 20 may switch between the first processing and the second processing based on the predicted demand for the power system in the time zone after the adjustment target period.

Although not particularly mentioned in the embodiment, at least some of the functions of the EMS 240 may be performed by a cloud server connected to the network 120. The EMS 240 may be considered to include the cloud server.

The invention claimed is:

1. A power management server comprising:
   a receiver configured to receive an adjustment message for adjusting a supply-demand balance of a power system;
   a management unit configured to manage two or more apparatuses;
   a controller configured to determine individual adjusted power amounts each adjusted by a respective one of the two or more apparatuses and start timings at each of which a respective one of the two or more apparatuses starts power adjustment through which a total adjusted power amount requested via the adjustment message is adjusted; and
   a transmitter configured to transmit a control message comprising an information element specifying the individual adjusted power amounts and the start timings; wherein
   the controller determines the start timings that are different from each other and each of which is for a respective one of the two or more apparatuses.

2. The power management server according to claim 1, wherein
   a predetermined time interval is set as a smallest unit for adjusting the supply-demand balance of the power system; and
   the controller determines the start timings that are different from each other and each of which is for a respective one of the two or more apparatuses within the predetermined time interval.

3. The power management server according to claim 1, wherein
   the total adjusted power amount is an information element specifying a range defined by a lower limit value of the total adjusted power amount and an upper limit value of the total adjusted power amount.

4. The power management server according to claim 3, wherein
   the controller determines the individual adjusted power amounts and the start timings with the lower limit value of the total adjusted power amount as a reference.

5. The power management server according to claim 3, wherein
   the controller determines the individual adjusted power amounts and the start timings with the upper limit value of the total adjusted power amount as a reference.

6. The power management server according to claim 1, wherein
   the transmitter transmits the control message comprising an information element specifying two or more different start timings to one or more apparatuses among the two or more apparatuses.

7. The power management server according to claim 1, wherein
   the two or more apparatuses comprise a power storage device; and
   the controller determines, as a start timing of the start timings, a start timing at which a discharging operation and/or a charging operation of the power storage device is started.

8. The power management server according to claim 7, wherein
   the controller determines a duration and a magnitude of power for a discharging operation and/or a charging operation of the power storage device.

9. The power management server according to claim 8, wherein
   the controller causes
   an end timing at which an n-th controlled discharging operation and/or charging operation of the power storage device is ended and
   a start timing at which an n+1-th controlled discharging operation and/or charging operation of the power storage device is started
   to coincide with each other.

10. The power management server according to claim 8, wherein
    the controller
    determines the start timings for the discharging operation of the power storage device to be performed throughout an adjustment target period for which power adjustment is requested via the adjustment message; and
    determines the start timings for the charging operation of the power storage device to be performed throughout the adjustment target period for which power adjustment is requested via the adjustment message.

11. A power management server comprising:
    a receiver configured to receive an adjustment message for adjusting a supply-demand balance of a power system; and
    a transmitter configured to transmit a control message to two or more gateway devices each controlling a respective one of apparatuses; wherein the control message comprises an information element specifying an adjusted power to be continuously adjusted by the apparatuses and an information element specifying duration for which the adjusted power is to be maintained for a total adjusted power amount requested via the adjustment message to be adjusted.

12. A power management method comprising:
(A) receiving an adjustment message for adjusting a supply-demand balance of a power system;
(B) determining individual adjusted power amounts each adjusted by a respective one of two or more apparatuses and start timings at each of which a respective one of the two or more apparatuses starts power adjustment for a total adjusted power amount requested via the adjustment message to be adjusted; and
(C) transmitting a control message comprising an information element specifying the individual adjusted power amounts and the start timings; wherein the step B comprises determining the start timings that are different from each other and each of which is for a respective one of the two or more apparatuses.

13. A power management method comprising:
(A) receiving an adjustment message for adjusting a supply-demand balance of a power system; and
(B) transmitting a control message to two or more gateway devices each controlling a respective one of apparatuses; wherein the control message comprises an information element specifying an adjusted power to be continuously adjusted by the apparatuses and an information element specifying a duration for which the adjusted power is to be maintained for a total adjusted power amount requested via the adjustment message to be adjusted.

* * * * *